United States Patent [19]

Patton

[11] Patent Number: 5,072,253
[45] Date of Patent: Dec. 10, 1991

[54] ORDERING AND RECORDING INFORMATION SYSTEM FOR BUSINESS AND GREETING CARDS

[75] Inventor: David L. Patton, Webster, N.Y.

[73] Assignee: Eastman Kodak Company, Rochester, N.Y.

[21] Appl. No.: 402,324

[22] Filed: Sep. 5, 1989

[51] Int. Cl.⁵ .............................. G03B 27/52
[52] U.S. Cl. ........................... 355/40; 355/20; 355/77; 346/107 R; 358/244
[58] Field of Search .............. 355/20, 40, 77, 64, 355/65, 66; 358/244; 354/75, 76, 105, 106; 346/107 R; 430/320

[56] References Cited

U.S. PATENT DOCUMENTS

| | | | |
|---|---|---|---|
| 3,801,201 | 4/1974 | Greenblatt | 355/40 |
| 3,947,110 | 3/1976 | Yamada et al. | 355/38 |
| 4,215,920 | 8/1980 | Butler | 354/105 |
| 4,340,286 | 7/1982 | Carr | 354/105 |
| 4,432,637 | 2/1984 | Baschung | 354/40 |
| 4,712,909 | 12/1987 | Oshikoshi | 355/40 |
| 4,933,773 | 6/1990 | Shiota et al. | 355/20 |
| 4,947,196 | 8/1990 | Wash et al. | 354/106 |

FOREIGN PATENT DOCUMENTS 2083652A  3/1982  United Kingdom ............ 354/105

OTHER PUBLICATIONS

"Automatic Makeover Printing System", Research Disclosure, Eastman Kodak, Mar., 1984.

Primary Examiner—A. A. Mathews
Attorney, Agent, or Firm—Francis H. Boos, Jr.

[57] ABSTRACT

A method of making a card such as a business card or greeting card on photosensitive media using images photographically recorded in successive frames on photographic film, the photographic film including a magnetic layer. The method comprises magnetically recording at an order entry station instructions in the magnetic layer instructions specifying one of the frames, a graphic location and a source of a graphic image to be placed on the graphic location, magnetically reading the instructions from the magnetic layer, fetching the graphic image from the source specified by the recorded instructions and generating a graphic light source to project the graphic image fetched from the source, and exposing at a print station one portion of the photosensitive media to the frame on the film corresponding to the frame number specified by the recorded instructions and exposing another portion of the photosensitive media to the graphic light source.

20 Claims, 5 Drawing Sheets

ORDERING AND RECORDING INFORMATION SYSTEM FOR BUSINESS AND GREETING CARDS

TECHNICAL FIELD

This invention relates to the method and apparatus for writing and conveying information directly on film to be used by a computer and printer in combination to produce business cards and greeting cards which have both photographic (optical) and cathode ray tube (CRT) printed information on the business and greeting card. The device allows the consumer to input the information to be printed with the photographic image in such a manner that it can be called up automatically by the printer when the print is being made.

BACKGROUND OF THE INVENTION

With the current method of making business and greeting cards using a photographic printer to produce both the scene and the text or graphic, two problems occur. The first problem is that the information to be printed either must be written down and explained to the person producing the cards, so that direct contact or "face to face" communications is required. It is known in the art that information concerning the printing of the negative, such as color and density, can be recorded on another media such as magnetic tape or floppy disk. See U.S. Pat. Nos. 4,340,286, 4,215,920, 3,947,110, and 4,432,637. This, however, requires synchronizing the information on a separate magnetic media in such a way that it matches the photographic information on the film, and therefore is not a viable solution to the first problem.

Once the information has been conveyed, there is a second problem. The method used to print the business or greeting cards requires a set up procedure in which a lithograph (a negative) must be made of the text, logo, or sentiment portion of the card. The making of this negative is very time-consuming and requires expensive equipment. Because of this, the choices of sentiments offered by the photofinisher for greeting and business cards are very limited and the procedure does not allow for any print personalization such as the addition of a signature and/or family name. It also increases greatly the time between when a business card is ordered and when it is delivered.

After the negative of the text or graphic is made, it is placed in a special printer gate along with the photographic negative of the scene/or person and the two are printed side by side on photographic paper. If one wanted to change any of the information a new negative would have to be made which would require more additional expense and time.

The problem of conveying the customer's information to the photofinisher in an efficient manner can be solved by having the customer record the information at the retail counter directly on a magnetic coating on the film in the same area as the photographic image. The ability to record information on a magnetic coating on film is described in Research Disclosure 23935 entitled Automatic Makeover Printing System. The Business Card/Greeting Card Reorder Station enables the user to choose text, font, color of font and graphics, add personal messages or a signature and record these directly on the film, thus linking the negative to be printed with the information to create the business card or greeting card. The information is inputted by the user at the location were he/she drops off the order for processing. It can then be read by a photographic printer at a location remote from the retail counter. The photographic printer reads the magnetically encoded information recorded on the film and uses it to call up the correct information via a logic and control module and computer program so the graphics and text can be printed using a CRT onto the photographic paper along with the photographic scene of the negative.

By using a computer, the text, font, color of font, graphics, added personal messages, and/or signature can be created and retrieved using well-known graphics computer programs stored in computer memory, and printed onto the photographic paper along side of the negative image. If the text or graphics information needs to be changed at a later time, the computer file is simply updated and the new information printed. This system also allows the printing of one order after another without the need to change a negative containing the text or graphics. In addition, special instructions (such as instructions describing what flat artwork is to be scanned using a video camera and how it is to be printed next to the other images, or instructions specifying selected computer-generated images) can be read from the film and displayed.

SUMMARY OF THE INVENTION

It is an object of the present invention to overcome the above-described problems in the prior art and to provide a method and apparatus for creating a business and/or a greeting card from an optical image on a negative and a computer generated graphic, text, a hand written signature, a piece of scanned flat artwork and encoding that information directly onto a film by means of a magnetic coating on the film, to be automatically read by a printer producing the chosen graphic, text, signature, and flat art work on a business or greeting card at the desired location on the card.

In accordance with the present invention, there is disclosed a method for choosing a format of a business or a greeting card, selecting a graphic from a library of graphics, selecting a font, a font size and a font color from a library of fonts, and using a selected font to create a text or to print a message selected from a library of messages.

The invention further includes a method for selecting and identifying a location on a card for a chosen graphic and text, a method for entering a signature and choosing and identifying a location on the card for that signature, a method for adding scanned flat artwork and choosing and identifying a location for that artwork and a method for encoding that information onto a magnetic coating on the film.

A photographic negative strip containing a negative image to be used to make a business card or greeting is inserted into a slot. Upon entering the slot, the negative strip is driven by a film transporting device such as a capstan drive past a magnetic read/write head, a menu asking for a choice between a business card or a greeting card, a frame number and a choice of method for using an input device (such as a keyboard) to make a selection between a business or greeting card format, and for entering a frame number is displayed on a CRT. The selected format and frame are entered using an input device such as a keyboard, causing a film transporting device such as a capstan to drive the negative strip passed a magnetic read/write head where a frame number (magnetically encoded onto the film either at the time of manufacture or by the camera) is read by the read head and matched to a chosen frame. That selected frame is then located under the write head and is positioned to be magnetically encoded.

A business card is created by selecting the business card option displayed on a CRT, entering a frame number, entering the number of cards to be printed, selecting a logo by choosing a logo from a graphics library showing each graphic available for use as a logo and entering a number corresponding to a specific graphic. A graphic can also be included by entering a mark indicating a logo is to be read from an additional magnetic media such as a floppy disk or scanned from a flat art work copy stand using a video camera. The graphic is positioned on a card by placing "X"'s in the blocks at a desire location. Text is entered by selecting a font style, a size and a color from a font library showing each font style, size, and color available and entering a number corresponding to a specific font style, font size, and color, and entering a character in a desired block to construct a message. When all the instructions have been completed, the information is magnetically recorded by a write head onto the film at a location corresponding and linked to a selected negative frame.

A greeting card is created by selecting the greeting card option displayed on a CRT, entering a frame number, entering the number of cards to be printed, entering what orientation a negative is to be printed, vertical or horizontal, entering a film size, selecting a sentiment by choosing a sentiment from a graphics library showing each graphic available for use as a sentiment and inputting a number corresponding to a specific graphic. A graphic can also be included by entering a mark indicating a graphic is to be read in from an additional magnetic media such as a floppy disk or scanned in from a flat art work copy stand using a video camera. Text is entered by selecting a font style, a size, and a color from a font library showing each font style, size, and color available and entering a number corresponding to a specific font style, size, and color, and entering a string of characters in a desired block to construct a message. A signature is added by scribing a signature on a digitizing pad or writing a signature in a specified block of a form and inputting the signature by scanning it on a flat art work copy stand using a video camera. When all the instructions have been completed, the information is recorded magnetically by a write head onto the film at a location corresponding and linked to a selected negative frame.

At a photographic printer an apparatus using a magnetic read head and logic control circuit reads the magnetically encoded instruction from the film strip, locates the selected frame and using the encoded numbers, calls up a selected graphic, font style, size, color, positions the graphic and text at the selected locations, and produces the desired number of business or greeting cards. The encoded instructions also inform the operator if a graphic and or signature are to be added from external sources.

BRIEF DESCRIPTION OF THE DRAWING

A preferred embodiment of the invention will be described in detail with reference to the accompanying drawings, in which:

FIG. 2 illustrates a business card format screen displayed on the CRT of FIG 1A; and FIG. 3 illustrates a greeting card format screen displayed on the CRT of FIG 1A.

DESCRIPTION OF THE PREFERRED EMBODIMENT

The present invention uses the method for magnetically encoding film with a magnetic coating on the base as shown and described in Research Disclosure 23935, "Automatic Makeover Printing System". As disclosed therein, a film strip with a clear magnetic coating made from materials containing dispersed magnetic particles, e.g., magnetic oxide, is coated on the film's base for the purpose of recording information thereon relating to the images and is moved past a magnetic write head where instructions specifying, for example, a particular graphic to be accessed from a canned computer graphics program, are written magnetically along a track on the coating.

Figure 1A:
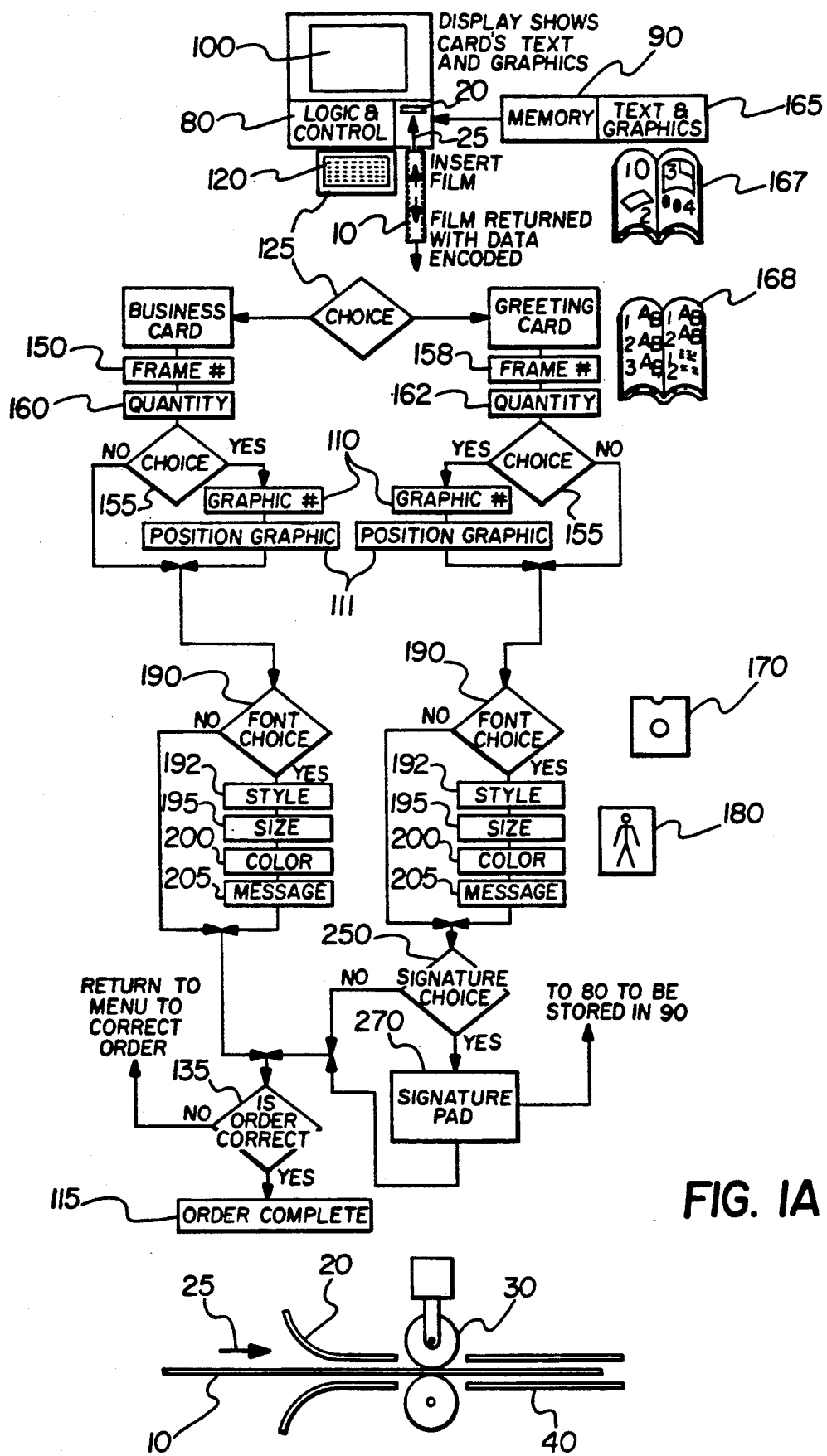
FIGS. 1A and 1B illustrate a presently preferred embodiment of the invention.

With reference to FIG. 1A, there is shown a method and an apparatus for feeding a film strip 10 into a slot 20 in direction 25 where it is driven by a pair of capstan rollers 30 and captured by a film track 40. Turning briefly to 1B, a capstan drive assembly 35 controlled by a logic and control unit 50 moves the film strip 10 past a magnetic read head 60 and a magnetic write head 70, both being controlled by a logic and control unit 80. The film track 40 places the magnetic coating 11 on the film strip's base 12 in contact with the magnetic read head 60 and the magnetic write head 70. The magnetic read head 60 with its logic and control unit 80 reads the encoded frame number from a magnetic coating 11 on a base side 12 of the film strip 10 and stores the frame numbers thus read in the control unit's memory 90.

Figure 1B:
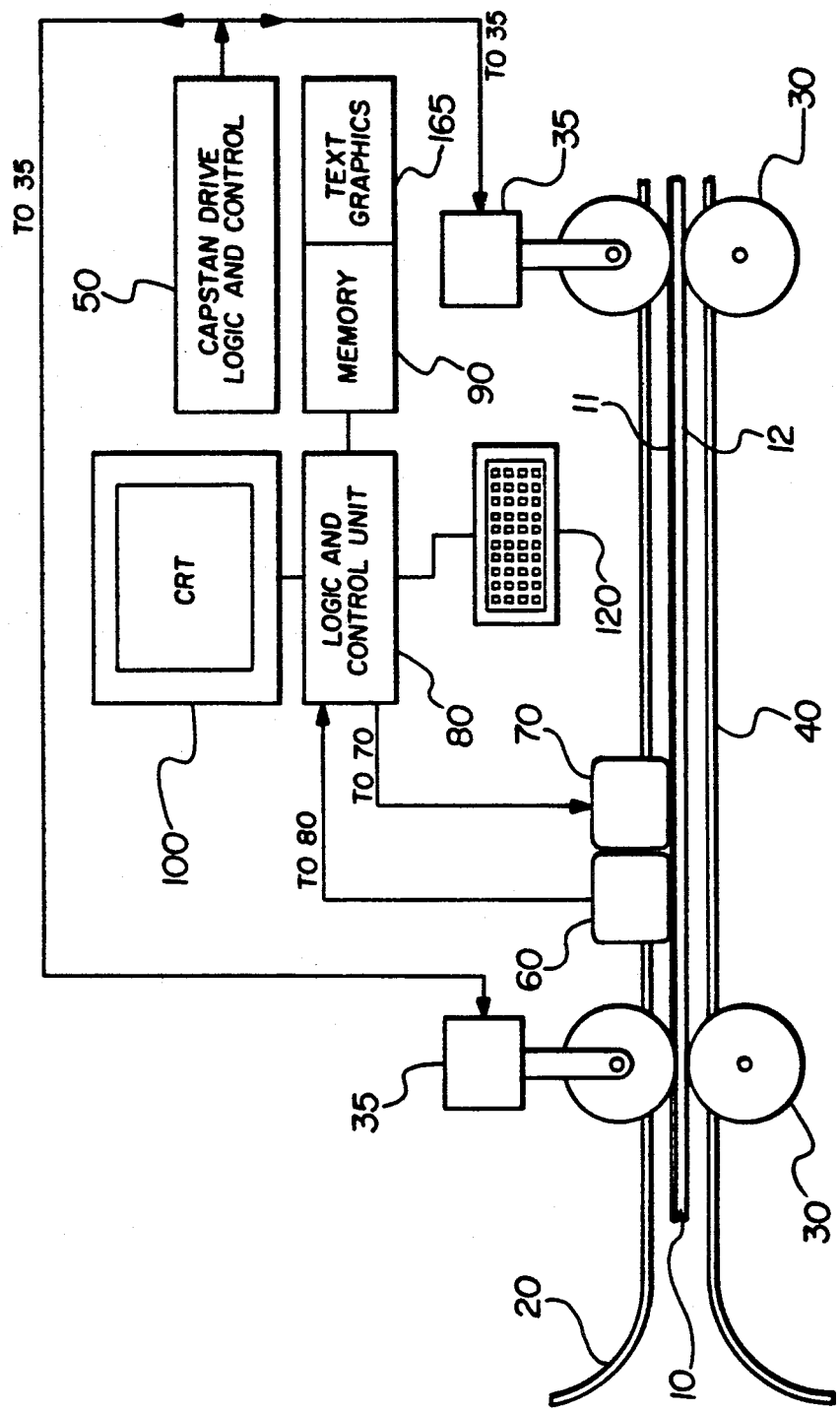

Now returning to FIG. 1A, a CRT 100, by means of the logic and control 80 displays via a menu the frame numbers read and stored in memory 90, and asks for one of the frame numbers to be entered on a keypad 120. Now returning to FIG. 1B, the entry of a frame number causes the capstan drive assembly 35 to drive the film strip 10 past the magnetic read head 60 until the chosen frame number is located and then the capstan drive assembly 35 positions the film strip 10 so that the chosen frame is located under the magnetic write head 70. Referring back to FIG. 1A, the CRT 100 now displays a menu which shows the appropriate keys on the keypad 120 to push to enter a choice 125 for creating a business card or a greeting card.

Figure 2:
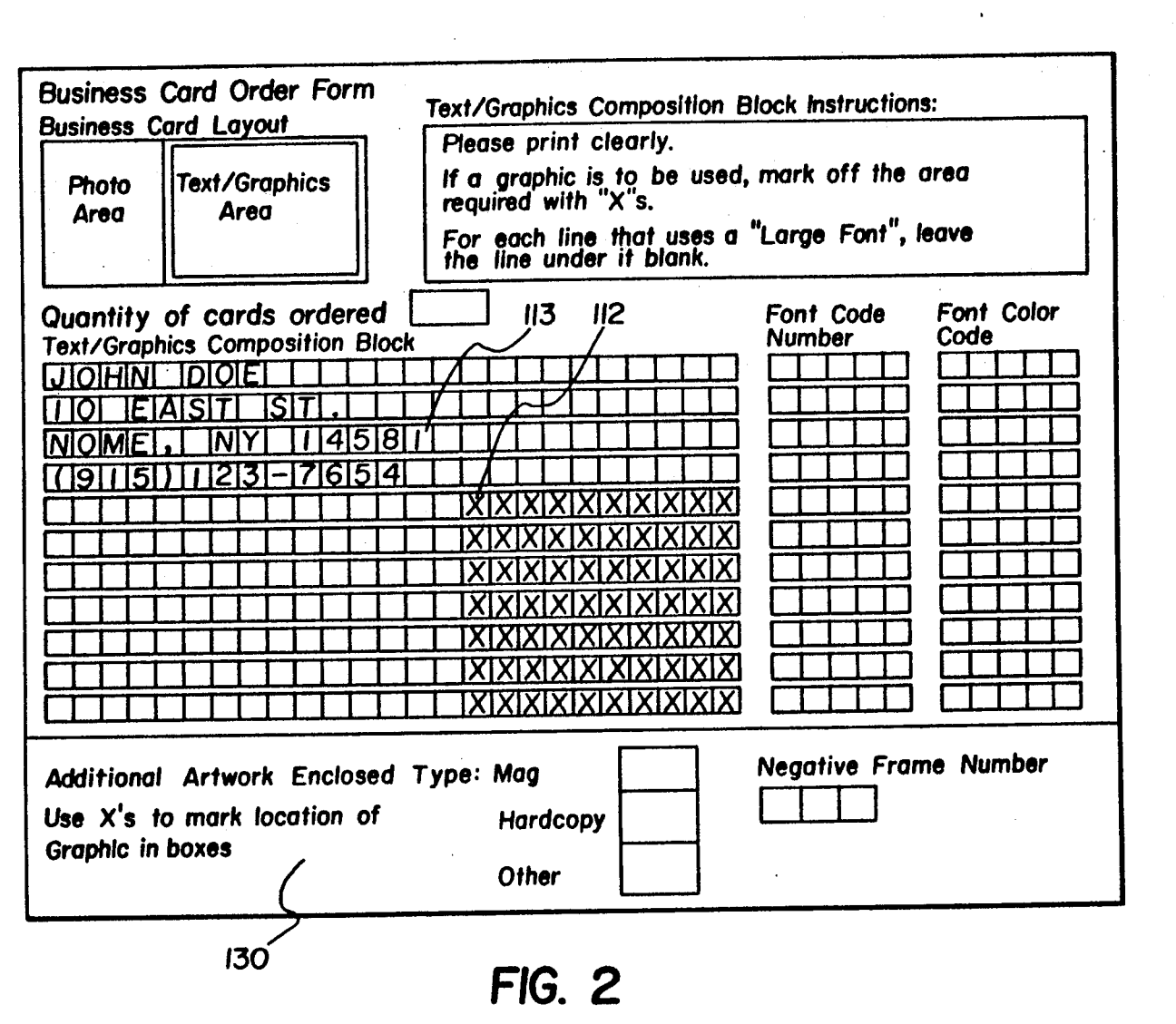

If a business card is chosen, a form 130 illustrated in FIG. 2 is displayed.

Returning to FIG. 1A, the logic and control unit 80 via the CRT 100 leads a user through a sequence of steps for creating a business card wherein the user first enters a frame number 150, enters a quantity of cards to be printed 160, chooses a graphic 155 by entering on the keypad 120 a number or name of a graphic 110 stored in a library of graphics a memory 165 which can be displayed on the CRT 100 or in a user's manual or book 167. Alternatively, the graphic may be chosen by entering a mark via the keypad 120 indicating that a graphic is to be read from an external source such as a floppy disk 170, or scanned from flat artwork 180 by a video.

The user is next instructed by the logic and control unit 80 via a menu displayed on the crt 100 how to indicate where on a business card a graphic may be located (111). Referring back to FIG. 2, the user is instructed to place "X"'s 112 representing the size of the graphic chosen at a desired location on the business card form 130 displayed on the CRT and then to strike a key once at a desired location on the keypad 120 in order to fix the "X"'s at that location.

Returning to FIG. 1A, the user is next instructed by the logic and control unit 80, via a menu displayed on the crt 100, how to select a font 190, a font style 192, a font size 195, and a font color 200 by entering a number or name of a font, style, and color via the keypad 120 corresponding to a font, style, and color displayed in a library of fonts stored in a memory 165 which can be displayed on the CRT 100 or in a user's manual or book 168.

The user is instructed by the logic and control unit 80 via a menu displayed on the CRT 100 to type a message 205, (see FIG. 2) at a desired location 113 on the card form 130 displayed on the CRT and (see to FIG. 1A) to strike a key on the keypad 120 fixing the message at that location 113. Briefly returning to FIG. 2, the business card order form 130 is now displayed on the CRT with all the information the user has entered, and a menu on the CRT asks whether the information is correct 135 and, if not correct, explains what the user must do to correct it, and if correct, what key to strike on the keypad.

Returning to FIG. 1A, the user is next instructed by the logic and control unit 80 via a menu displayed on the CRT 100 to enter via a key on the keypad 120 that the business card order is complete (115). Upon doing so, the order information is stored in memory 90.

Returning to FIG. 1B, the capstan drive logic and control unit 50 drives the film strip 10 via the capstan assembly 35 past and in contact with the magnetic write head 70 while the magnetic write head 70 magnetically writes the order information stored in memory 90 on the magnetic surface 12 at a location designated by the chosen frame number.

Figure 3:
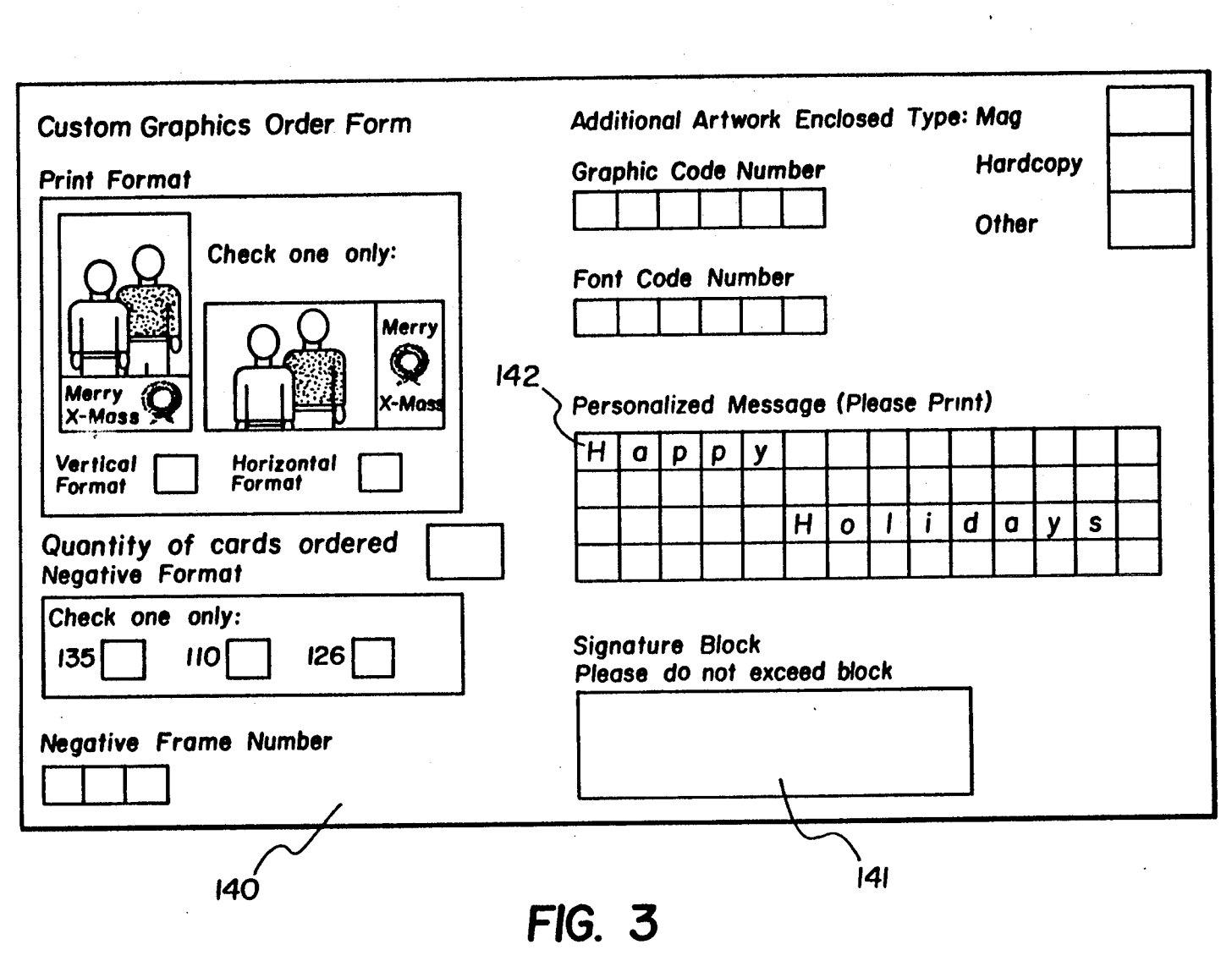

When a greeting card is chosen, form 140 illustrated in FIG. 3 is displayed.

Returning to FIG. 1A, the logic and control unit 80 via the CRT 100 leads the user through a sequence of steps comprising a method for creating a greeting card such that the user first enters a frame number 158, enters a quantity of cards to be printed 162, chooses a graphic 155 by entering a number or name of a graphic 110 on the keypad 120 (corresponding to a graphic in a library of graphics stored in a memory 165 which can be displayed on the crt 100 or in the book 167) or by entering a mark via the keypad 120 indicating that a graphic is to be read from an external source such as a floppy disk 170, or scanned from flat artwork 180 by a video camera.

Returning to FIG. 1A, the user is next instructed by the logic and control unit 80 via a menu displayed on the CRT 100 how to select a font 190, a font style 192, a font size 195, and a font color 200 by entering a number or name of a font, style, and color via the keypad 120 corresponding to a font, style, and color displayed in a library of fonts stored in a memory 165 which can be displayed on the CRT 100 or in the book 168.

The user is instructed by the logic and control unit 80 via a menu displayed on the crt 100 to type a message 205 (see to FIG. 3) at a desired location 142 on the greeting card form 140 displayed on the CRT and to strike a key once at a desired location on the keypad 120 in order to fix the message at that location 142.

Figure 4:
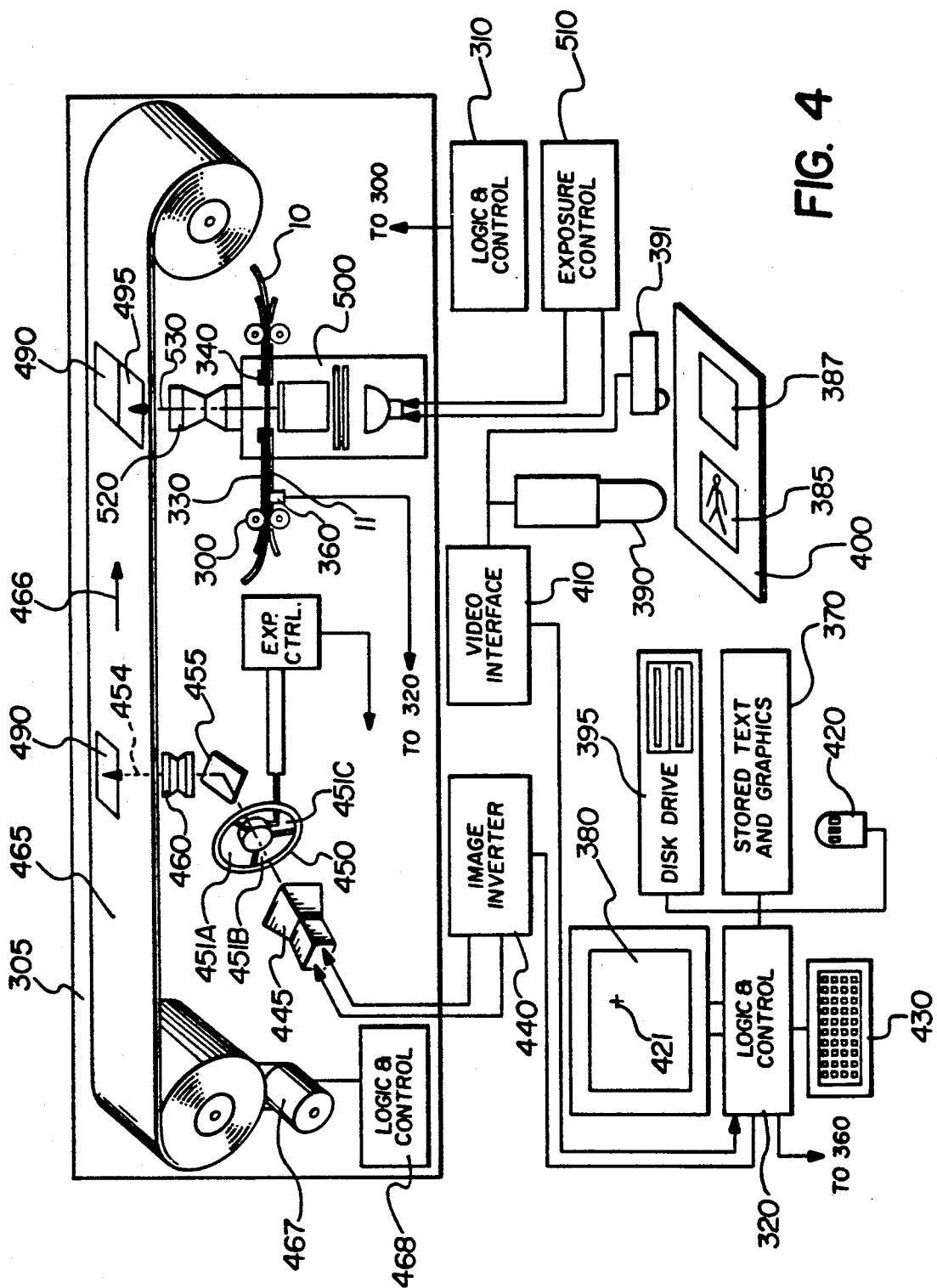
FIG. 4 is a schematic diagram of an apparatus for reading a magnetically encoded message from a film strip with a magnetic coating on the film's base and for printing a computer-generated text, graphic, scanned flat art or scanned signature onto photographic paper with an image printed optically on a photographic printer.

The user is next instructed by the logic and control unit 80 via a menu displayed on the CRT 100 how to enter a personal signature 250 by either scribing a signature on a signature pad 270 which is stored in memory 90 or by writing a signature on the order form 140 which is entered by scanning the written signature using a video camera 390 or hand scanner 392 at the printer (see FIG. 4).

The user is next instructed by the logic and control unit 80 via a menu displayed on the crt 100 where on the greeting card form a signature may be placed. Referring back to FIG. 3, the user is instructed to write a signature at a specific location 141 on the greeting card form 140.

Returning to FIG. 1A, the greeting card order form 140 is now displayed on the CRT with all the information the user has entered, and a menu asks if the information is correct (135) and, if not correct, the menu explains what the user must do to correct it, and, if correct, what key to strike on the keypad.

Returning to FIG. 1A, the user is next instructed by the logic and control unit 80 via a menu displayed on the CRT 100 to enter via a key on the keypad 120 that a greeting card order is complete 115. Upon doing so, the order information is stored in memory 90.

Returning to FIG. 1B, the capstan drive logic and control unit 50 drives the film strip 10 via the capstan assembly 35 past and in contact with the magnetic write head 70 while the magnetic write head 70 magnetically writes the order information stored in memory 90 onto the magnetic surface 11 at a location designated by the chosen frame number.

Referring to FIG. 4, a capstan drive assembly 300 in a photographic printer 305 controlled by a logic and control unit 310 moves the encoded film strip 10 past a magnetic read head 360 controlled by a logic and control unit 320. The film track 330 places the film strip 10 in contact with the magnetic read head 360. The magnetic read head 360 with its logic and control unit 320 reads the encoded order information from a magnetic coating 11 on the film strip 10. The logic and control unit 320 uses that information to locate the frame to be printed in a printer gate 340 and to retrieve the business card or greeting card format from memory 370. The logic and control unit 320 via the crt 380 leads an operator through a sequence of steps comprising a method for printing the selected business card or greeting onto photographic paper.

After the format has been retrieved, the selected graphic, graphic location, font style, font size, font color, and font location are called from memory 370 and displayed on a crt 380. A message, indicating whether flat artwork 385 or a signature 387 is to be entered via the video camera scanner 390 or a hand held scanner 391, or whether a graphic or a signature is to be entered via an external disk drive 395, appears on the CRT and the operator is instructed via the CRT to either place a disk in the disk reader 395 or place the flat artwork 385 or signature 387 onto a platen 400 under the video camera 390 or pass the signature under the hand scanner 391. The video camera 390 or hand scanner 391, with its control and logic 320 and computer interface 410 for image transfer scans the flat artwork or signature and displays it on the crt 320 where the operator using a mouse 420, positions the image via a display and cursor 421.

When the business or greeting card image is complete as displayed on the CRT, the operator strikes a key on the keypad 430 which causes the image to be printed on the photographic paper.

The image is printed by passing the image signal through an image inverter 440 to a crt 445, exposing a red, green, and blue image serially on a CRT 445, passing those images through a filter wheel 450 containing red 451A, green 451B, and blue 451C filters in a direction 454, and reflecting those images with a mirror 455 through a lens 460 onto photographic paper 465. After photographically recording the CRT image, the paper advances in a direction 466 via a printer paper advance 467 governed by logic and control 468, until the latent image of the CRT exposure 490 is located adjacent the image 495 on the negative film strip 10 positioned in the film gate 340. The negative image 495 is exposed optically directly adjacent to the CRT image via a photographic lamp house 500 governed by logic and control 510 through a lens 520 in a direction 530.

The paper is then processed using a photographic paper processor and photographic paper process.

While the invention has been described in detail with reference to preferred embodiments thereof, it is understood that variations and modifications thereof may be made without without departing from the true spirit and scope of the invention.

What is claimed is:

1. A method of making a card on photosensitive media using images photographically recorded in successive frames on photographic film, said photographic film including a magnetic layer, said method comprising:
    magnetically recording at an order entry station instructions in said magnetic layer on said film, said instructions specifying one of said frames, a graphic location and a source of a graphic image to be placed in said graphic location;
    magnetically reading said instructions from said magnetic layer, fetching said graphic image from the source specified by said recorded instructions and generating a graphic light source to project said graphic image fetched from said source; and
    exposing at a print station one portion of said photosensitive media to the frame on said film corresponding to the frame number specified by said recorded instructions and exposing another portion of said photosensitive media adjacent said one portion and corresponding to the location specified by said recorded instructions to said graphic light source.

2. The method of claim 1 wherein said step of fetching said graphic image comprises addressing a memory containing a digital representation of said graphic image with a memory address derived from said recorded instructions.

3. The method of claim 2 wherein said step of generating said graphic light source comprises generating a still video signal from said digital representation fetched from said memory and transmitting said video signal to a cathode ray tube.

4. The method of claim 3 wherein said step of exposing said other portion of said media comprises reading said graphic location in said instructions, determining the boundaries of said other portion of said photosensitive media from said graphic location and directing light from said cathode ray tube to said other portion.

5. The method of claim 3 wherein said source of said graphic image comprises any one of a digital font program, digital graphics program, a digitizer tablet or a still video camera.

6. The method of claim 3 wherein said magnetic recording step is preceeded by the step of displaying a menu enumerating either or both of a choice of previously stored graphic images and a choice of previously stored print fonts, sizes, colors and text messages.

7. The method of claim 7 wherein said magnetic reading step further comprises the step of sensing a specified one of any of said graphic images, fonts, print sizes or printed text messages and fetching from said memory the corresponding digital data stored in said memory, and wherein said generating step produces a graphic light source representative of the specified ones of any of said graphics images, fonts, prints sizes or printed text messages.

8. A method of making a card on photosensitive media using images photographically recorded in successive frames on photographic film, said photographic film including a magnetic layer, said method comprising:
    magnetically recording at a customer location instructions in said magnetic layer specifying one of said frames and a graphic image;
    magnetically reading at a photofinishing location said instructions from said magnetic layer and generating therefrom a light source representing said graphic image; and
    exposing respective portions of said photosensitive media to said frame of said film and to said graphic image light source.

9. The method of claim 8 wherein said graphic image comprises any one of a digital representation of a graphic artwork image stored in a memory, a digital representation of a text message stored in a memory, a digitizer tablet-generated digital representation, or a still video signal from a video source.

10. The method of claim 8 wherein said recording step comprises recording instructions defining the size of said graphic image and its location one said photosensitive media, and wherein said reading step reads said defining instructions whereby said exposing step exposes a graphics portion of said media with said graphics image light source whereby said graphics portion corresponds to said size and said location defined by said defining instructions.

11. An apparatus for making a card on photosensitive media using images photographically recorded in successive frames on photographic film, said photographic film including a magnetic layer, said apparatus comprising:
    means for magnetically recording at an order entry station instructions in said magnetic layer on said film, said instructions specifying one of said frames, a graphic location and a source of a graphic image to be placed in said graphic location;
    means for magnetically reading said instructions from said magnetic layer, fetching said graphic image from the source specified by said recorded instructions and generating a graphic light source to project said graphic image fetched from said source; and
    means for exposing at a print station one portion of said photosensitive media to the frame on said film corresponding to the frame number specified by said recorded instructions and exposing another portion of said photosensitive media adjacent said one portion and corresponding to the location specified by said recorded instructions to said graphic light source.

12. The apparatus of claim 11 wherein said means for fetching said graphic image comprises means for addressing a memory containing a digital representation of said graphic image with a memory address derived from said recorded instructions.

13. The apparatus of claim 12 wherein said means for generating said graphic light source comprises means for generating a still video signal from said digital representation fetched from said memory and transmitting said video signal to a cathode ray tube.

14. The apparatus of claim 13 wherein said means for exposing said other portion of said media comprises means for reading said graphic location in said instructions, determining the boundaries of said other portion of said photosensitive media from said graphic location and directing light from said cathode ray tube to said other portion.

15. The apparatus of claim 13 wherein said source of said graphic image comprises any one of a digital font program, digital graphics program, a digitizer tablet or a still video camera.

16. The apparatus of claim 13 wherein said magnetic recording means includes means for displaying a menu enumerating either or both of a choice of previously stored graphic images and a choice of previously stored print fonts, sizes and text messages.

17. The apparatus of claim 16 wherein said means for reading further comprises means for sensing a specified one of any of said graphic images, fonts, print sizes or printed text messages and fetching from said memory the corresponding digital data stored in said memory, and wherein said means for generating produces a graphic light source representative of the specified ones of any of said graphics images, fonts, prints sizes or printed text messages.

18. An apparatus for making a card on photosensitive media using images photographically recorded in successive frames on photographic film, said photographic film including a magnetic layer, said apparatus comprising:

means for magnetically recording at a customer location instructions in said magnetic layer specifying one of said frames and a graphic image;

means for magnetically reading at a photofinishing location said instructions from said magnetic layer and generating therefrom a light source representing said graphic image; and means for exposing respective portions of said photosensitive media to said frame of said film and to said graphic image light source.

19. The apparatus of claim 18 wherein said graphic image comprises any one of a digital representation of a graphic artwork image stored in a memory, a digital representation of a text message stored in a memory, a digitizer tablet-generated digital representation, or a still video signal from a video source.

20. The apparatus of claim 18 wherein:

said means for recording comprise means for recording instructions defining the size of said graphic image and its location one said photosensitive media, and said means for reading comprises means for reading said defining instructions and for controlling said means for exposing, whereby said graphics portion corresponds to said size and said location defined by said defining instructions.

* * * * *